US006214075B1

(12) United States Patent
Filges et al.

(10) Patent No.: US 6,214,075 B1
(45) Date of Patent: Apr. 10, 2001

(54) CYCLONE SEPARATOR

(75) Inventors: Ralf Filges, Bergisch Gladbach; Horst Schilling, Cologne, both of (DE)

(73) Assignee: KHD Humboldt Wedag AG (DE)

(*) Notice: Subject to any disclaimer, the term of this patent is extended or adjusted under 35 U.S.C. 154(b) by 0 days.

(21) Appl. No.: 09/324,882

(22) Filed: Jun. 3, 1999

(30) Foreign Application Priority Data

Jun. 5, 1998 (DE) ............................................ 198 25 206

(51) Int. Cl.[7] ............................ B01D 45/12; B04C 5/20; F16L 9/22

(52) U.S. Cl. ...................... 55/434.2; 55/434.4; 55/459.1; 138/107; 138/155

(58) Field of Search .................................. 55/399, 434.2, 55/434.4, 447, 459.1; 96/301, 321; 138/107, 155

(56) References Cited

U.S. PATENT DOCUMENTS 1,844,369 * 2/1932 Ross .
1,916,762 * 7/1933 Hinsch .
3,273,320 * 9/1966 Delaune et al. .
4,505,051 * 3/1985 Herchenbach et al. .
4,651,783 * 3/1987 Christiansen .
4,956,090 * 9/1990 Robinson .
5,441,081 * 8/1995 Maury .

FOREIGN PATENT DOCUMENTS

C-32 28 902 5/1987 (DE) .

* cited by examiner

*Primary Examiner*—David A. Simmons
*Assistant Examiner*—Fred Prince
(74) *Attorney, Agent, or Firm*—Sonnenschein Nath & Rosenthal

(57) ABSTRACT

In order to create a cyclone separator with segmented immersion pipe for cement clinker manufacturing system with cyclone suspension type heat exchanger system, whereby the releasable immersion pipe segment fastening is dependable and is distinguished by a long service life, it is inventively proposed to secure the immersion pipe segments at their upper end with releasable screw bolts, whereby the screw bolts are arranged in spacer sleeves distributed around the immersion pipe circumference that respectively comprise at least one window-like opening at the outside for the access of ambient air as coolant for the immersion pipe segment fastening.

19 Claims, 2 Drawing Sheets

CYCLONE SEPARATOR

BACKGROUND OF THE INVENTION

The invention is directed to a cyclone separator, particularly for direct heat transmission from the hot exhaust gasses of a rotary tubular kiln/cyclone suspension type heat exchanger for cement clinker manufacture onto the raw cement meal, having tangential delivery of gas and raw meal, product discharge in the lower cyclone area and having an immersion pipe for gas elimination that is composed of a plurality of segments, which immersion pipe, projects centrally from above into the cyclone separator and is suspended at the cyclone ceiling, whereby the immersion pipe segments have their upper end releasably connected by screw bolts to the gas withdrawal conduit insulated by a refractory lining.

In systems for manufacturing cement clinker from raw cement meal, the raw meal is thermally treated by preheating, calcining, sintering and cooling, whereby the exhaust gas stream of the sintering unit and the exhaust air stream of the cooling unit from the clinker cooler are utilized, either separately or in common, for the calcination of the raw meal in a calcining unit supplied with fuel that is still located outside the sintering furnace. The preheating unit is usually composed of a plurality of suspension type heat exchanger cyclones arranged above one another through which the raw cement meal successively migrates in a combined co-current, counter-current stream relative to the hot exhaust gas of the calcining unit or, respectively, of the rotary tubular kiln. The product material pre-calcined in the calcining unit is thereby separated from the hot gas in the lowest cyclone of the cyclone suspension type heat exchanger system and is introduced into the rotary tubular kiln. It is self-evident that the hot gas cyclones of the cyclone suspension type heat exchanger line, particularly the lowest cyclone that comes into contact with hot gas and hot meal having a temperature of, for example, 700 through 950° C., are exposed to a high mechanical, chemical and thermal stressing and, thus, to high thermo-chemical and abrasive wear. This is especially true of the immersion pipe centrally projecting from above into the cyclone separator.

Given a cyclone separator exposed to these high stresses, it is therefore already known (DE-C-32 28 902) to compose the immersion pipe of a plurality of segments and to suspend the immersion pipe segments at the cyclone ceiling with a hook-shaped fashioning or to releasably connect the immersion pipe-segments with radially arranged screw bolts to the gas discharge conduit of the cyclone that is insulated by a refractory lining, in order to avoid deformations at the immersion pipe cladding even given high, thermal alternating stresses, and in order to be able to replace individual immersion pipe segments with comparatively little time and work expenditure, in case of wear. However, the screwed connections of the immersion pipe segments were thereby not protected against the thermo-chemical stresses, with the consequence that the risk was not precluded that the screwed connection unscrewed after a certain time, after which, given the lack of further safety measures, the appertaining immersion pipe segment could drop down into the cyclone separator.

SUMMARY OF THE INVENTION

The invention is therefore based on an object of creating a cyclone separator with segmented immersion pipe for cement clinker manufacturing systems with a cyclone suspension type heat exchanger system, wherein the releasable immersion pipe segment fastening arrangement is dependable and is characterized by a long service life.

This object is inventively achieved in accordance with the features of the invention described below.

What is characteristic of the inventive cyclone separator with segmented immersion pipe, whereby the immersion pipe segments have their upper ends releasably connected by approximately radially arranged screw bolts to the cyclone ceiling or, respectively, to the cyclone gas withdrawal conduit, is that the screw bolts are arranged in spacer sleeves arranged distributed around the circumference of the immersion pipe that outwardly (i.e., lying radially at the outside) respectively comprise at least one window-like opening for the access or inlet of ambient air as a coolant for the fastening arrangement of the immersion pipe segment. What this design achieves is that the screw bolts can conduct and eliminate the high temperatures acting proceeding from the inside of the immersion pipe, which high temperatures can amount to about 900° C. without further ado in the lower region of a cyclone suspension type heat exchanger system of a cement clinker manufacturing system given hot gas cyclones, into the ambient air, as cooling air, accessible through the window-like openings of the spacer sleeves. It would also be possible to provide the inside space of the spacer sleeves, together with the screw bolts, with forced aeration by a blower or the like through the window-like openings, as well as, potentially, to even provide the inside space with an admission and discharge for a liquid coolant.

According to a further feature of the invention, the head of the screw bolt arranged at the inside of the immersion pipe, in a corresponding recess of the immersion pipe segment, as well as in the spacer sleeve, is respectively covered by a cover, so that the screw bolts are protected against mechanical and thermo-chemical stresses proceeding from this side. Overall, a long service life of the inventive, releasable fastening arrangement of the immersion pipe segments of a thermo-chemically highly stressed cyclone separator thereby derives, particularly for the hot zones of a cyclone suspension type heat exchanger line.

According to a further feature of the invention, the immersion pipe segments can comprise outwardly angularly projecting projections with a hook-shaped cross section at their upper end with which the immersion pipe segments engage into a web that extends upward from the inside of the spacer sleeves. This combined fastening of the immersion pipe segments offers a high degree of dependability for the fastening arrangement. Further, assembly is facilitated when the segments are hooked in first, as a result whereof the weight of the segments is relieved, for when the suspended immersion pipe segments are subsequently aligned and screwed.

For connecting two respective immersion pipe segments arranged next to one another and under one another, i.e., a total of four immersion pipe segments, a retainer plate having four transverse bolts that are plugged through four corresponding holes in the four adjoining comers of the immersion pipe segments and covering the crossing-joint region at one side of the segments, can be arranged in the crossing-joint region in which two immersion pipe segments neighboring side-by-side and two immersion pipe segments arranged therebelow adjoin one another, whereby cross-bolts for securing the retainer plates are then secured on the four transverse bolts that have been plugged through.

BRIEF DESCRIPTION OF THE DRAWING

The invention and further features and advantages thereof are explained in greater detail on the basis of the exemplary embodiment schematically shown in the figures.

DETAILED DESCRIPTION OF THE PREFERRED EMBODIMENTS

Figure 1:
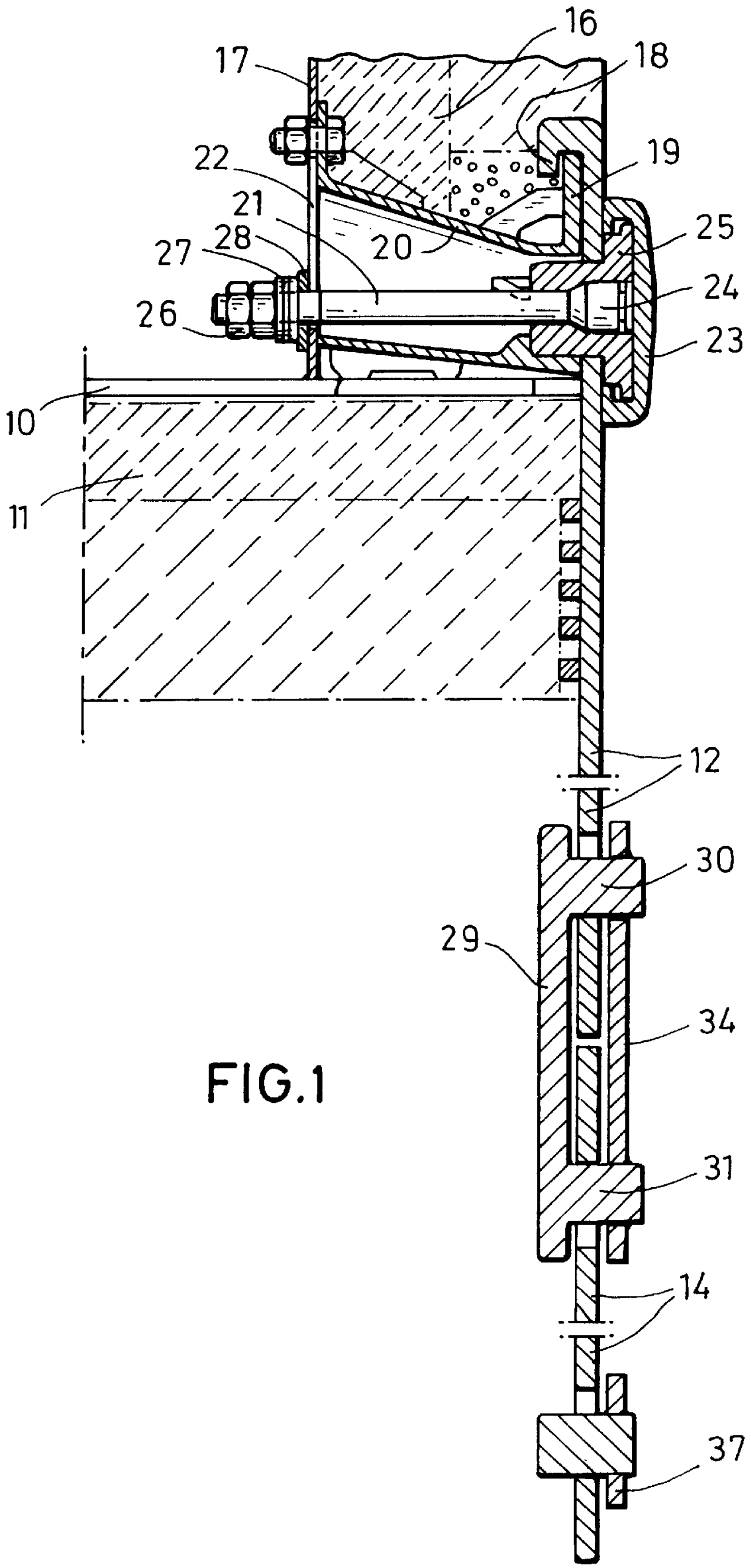
FIG. 1 is a partial vertical sectional view through the inventive immersion pipe segment fastening along the line I—I of FIG. 2.
Figure 2:
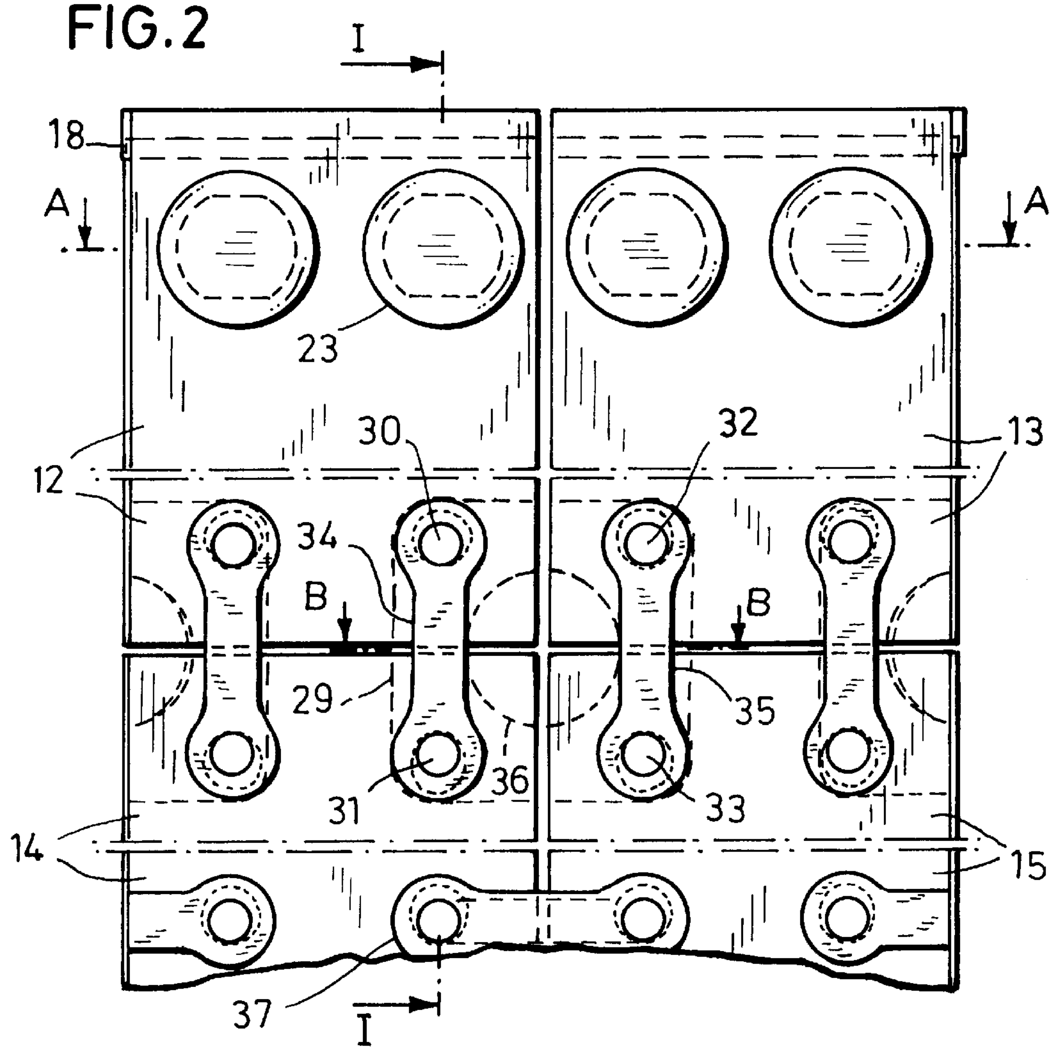
FIG. 2 is a partial side elevational view of the immersion pipe segment fastening of FIG. 1 seen from the right.
Figure 3:
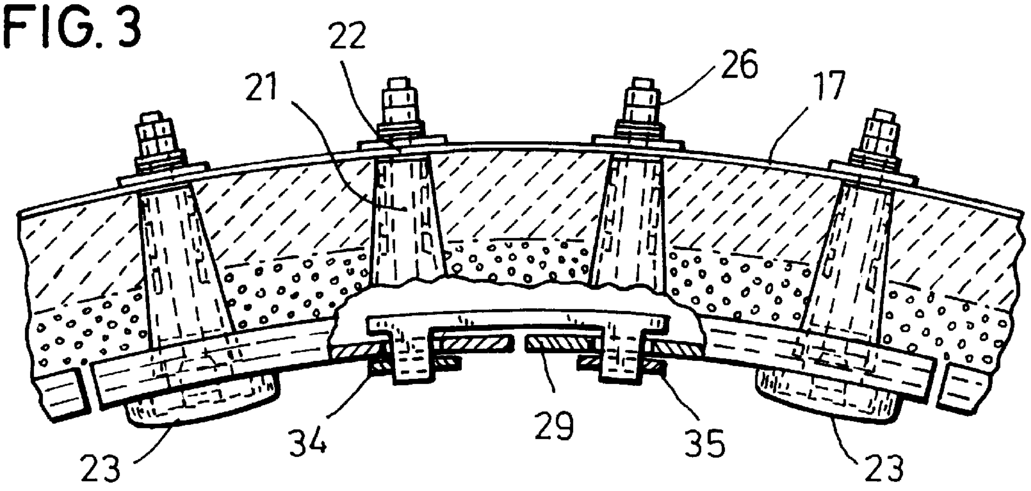
FIG. 3 is a partial horizontal sectional view through the immersion pipe segment fastening along the line IIIA—IIIA and including a section taken along the line IIIB—IIIB of FIG. 2.

Excerpted from a cyclone separator, FIG. 1 shows a cyclone ceiling 10 that has its inside provided with a refractory lining 11. Hot gas and raw cement meal of a system for manufacturing cement clinker enter tangentially into the cyclone. For the gas elimination, an immersion pipe that is composed of a plurality of segments arranged in rows and columns and suspended at the cyclone ceiling 10 projects centrally from above into the cyclone separator. Two immersion pipe segments 12 and 13 arranged next to one another can thus be seen in FIG. 2, the further immersion pipe segments 14 and 15, etc., being in turn attached to these at the bottom. A structure such as gas discharge conduit 17 defining an outer circumference provided with a refractory lining 16 at the inside and defining an inner circumference departs centrally upward from the cyclone ceiling 10.

The immersion pipe segments 12, 13, etc. of the uppermost row define a circumference approximately the same size as the inner circumference of the refractory lining. Distributed around the immersion pipe circumference at the top of the uppermost row of segments are outwardly angular salient hook-shaped projections 18 with which the immersion pipe segments engage onto a web or rim 19 that extends upward from a radially inner end of spacer sleeves 20 which are arranged in a circle having a circumference just larger than the circumference of the pipe segments. Seated on the cyclone ceiling 10 and distributed around the immersion pipe circumference, the spacer sleeves 20 are secured to the gas discharge conduit 17 by bolts or other fastening arrangement and are arranged approximately radially relative to the immersion pipe center. The spacer sleeves 20 each extend from the outer circumference of the gas discharge conduit to the inner circumference of the refractory lining. A plurality of approximately radially arranged screw bolts 21, with which the immersion pipe segment 12 is releasably connected to the insulated gas discharge conduit 17, are respectively arranged in the spacer sleeves 20, with one bolt 21 in each sleeve 20.

Spacer arrangements other than individual sleeves may be provided so long as they extend from the outer circumference of the structure at the gas discharge opening in the ceiling of the cyclone separator to the inner circumference, and include an opening in the spacer arrangement and the structure adjacent each screw bolt to provide access for ambient air to flow into a space surrounding each screw bolt.

For facilitating assembly, the immersion pipe segments 12 etc., are first hooked onto the spacer sleeves 20 or, respectively, their webs 19, with the hook-shaped projections 18, as a result whereof the weight of the segments is relieved. The segments are subsequently aligned and screwed.

Inventively, the spacer sleeves 20, distributed around the immersion pipe circumference and wherein the screw bolts 21 are arranged respectively, and each have at least one window-like opening 22 toward the radial outside through the gas discharge conduit 17 for the access of ambient air as a coolant for the fastening arrangement of the immersion pipe segments. In this way, the screw bolts 21 can conduct an eliminate or discharge the high temperatures acting from the inside of the immersion pipe well to the outside of the immersion pipe. Added thereto is that the head of the screw bolts 21, which is arranged at the inside of the immersion pipe in a corresponding recess of the immersion pipe segment 12, etc., as well as in the spacer sleeve 20, is respectively covered by a cover 23 that protects the fastening arrangement of the immersion pipe segments against the high thermo-chemical stressing. After being mounted, the cover 23 can also be secured to the immersion pipe segment 12, etc., by a tack weld. At any rate, the inventive fastening arrangement of the immersion pipe segments is characterized by a long service life.

It can also be seen in FIG. 1 that the screw bolts 21 have a thickened or enlarged head 24 that is positioned in a recess of a cap 25 with which the immersion pipe segment 21 is clampable to the inside end of the spacer sleeves 20 or, respectively, to their inside end web 19. At their radially outwardly disposed end, the screw bolts 21 comprise nuts 26 with which they are supported at the radial outside end of the spacer sleeves 20 via saucer springs or spring washers 27 and via a disk or flat washer 28.

In the crossing/joint region wherein respectively two immersion pipe segments (12, 13, 14, 15) neighboring one another side-by-side and two arranged therebelow adjoin, a retainer plate 29 covering the crossing/joint region at one side of the segments can be arranged, this retainer plate 29 having four cross-bolts 30, 31, 32, 33 that are plugged through four corresponding holes in the four adjoining comers of the immersion pipe segments, whereby cross brackets 34, 35 for securing the retainer plate 29 are secured on the four cross-bolts that are plugged through. As shown, the cross brackets 34, 35 can be vertically arranged; however, they can also be horizontally or diagonally arranged. The outside contour of the retainer plate 29 can be rectangular, quadratic, round, cross-shaped, etc., and it can also comprise a central recess 36, for example a round hole, which contributes to a weight-saving in the retainer plate 29. The lowest row of the immersion pipe segments is expediently secured at the bottom only with cross brackets 37 providing a horizontal connection. Although the retainer plates 29 are illustrated as being positioned on the radial exterior of the immersion pipe segments, with the cross brackets 34, 35 being positioned on the radial interior of the immersion pipe segments, this arrangement could also be reversed with the retainer plates positioned on the interior and the cross brackets positioned on the exterior.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A cyclone separator, for direct heat transmission from the hot exhaust gasses of a rotary tubular kiln/cyclone suspension type heat exchanger for cement clinker manufacture onto a raw cement meal, having tangential delivery of gas and raw meal and a product discharge in a lower cyclone area, and having an immersion pipe for gas elimination that is composed of a plurality of segments, which projects centrally from above into the cyclone separator and is suspended at a cyclone ceiling, whereby the immersion pipe segments have their upper end releasably connected by a fastening arrangement comprising radially extending screw bolts to a gas discharge conduit insulated by a refractory lining, wherein the screw bolts are arranged in spacer sleeves arranged distributed around a circumference of the immersion pipe with each spacer sleeve radially outwardly comprising at least one opening for the access of ambient air as coolant for the fastening arrangement of the immersion pipe segment.

2. A cyclone separator according to claim 1, wherein a head of the screw bolt arranged at the inside of the immersion pipe in a corresponding recess of the immersion pipe segment, as well as in the spacer sleeve, is covered by a cover.

3. A cyclone separator according to claim 2, wherein the screw bolts have a thickened head that is positioned in a recess of a cap with which the immersion pipe segment is clampable at a radial inside end of the spacer sleeve.

4. A cyclone separator according to claim 1, wherein the screw bolts comprise nuts at a radially outwardly disposed end of said screw bolts with which the screw bolts are supported at a radial end of the spacer sleeves via saucer springs.

5. A cyclone separator according to claim 1, wherein, at an upper end of the immersion pipe segments, the immersion pipe segments comprise a radially outwardly angularly salient projection with which the immersion pipe segments engage into a web that extends up from a radial inside end of the spacer sleeves.

6. A cyclone separator according to claim 1, wherein in a crossing/joint region wherein respectively two immersion pipe segments neighboring one another side-by-side and two arranged therebelow adjoin, a retainer plate covering the crossing/joint region at one radial side of the segments is arranged, said retainer plate having four cross-bolts that are plugged through four corresponding holes in four adjoining comers of the immersion pipe segments, and wherein cross brackets for securing said retainer plate are positioned on an appropriate radial side of said pipe segments and are secured on the four cross-bolts that are plugged through.

7. An immersion pipe for use in a cyclone separator, wherein said cyclone separator includes a ceiling with a gas discharge opening therein, and a structure provided at said opening in said ceiling, said structure having an exterior circumference and an inwardly spaced interior circumference, comprising:

a plurality of segments being joined together in rows and columns to form said immersion pipe which has a circumference approximately equal to said interior circumference, a spacer arrangement secured to and extending radially inwardly from said outer circumference of said structure to said inner circumference, a fastening arrangement comprising a plurality of screw bolts for releasably connecting a top row of said segments against said spacer arrangement and to said structure, at least one opening arranged in said structure and spacer arrangement adjacent to a radial outer end of each screw bolt to provide access for ambient air to flow into a space surrounding said screw bolt.

8. An immersion pipe according to claim 7, wherein said spacer arrangement comprises a plurality of spacer sleeves distributed around said circumference of said immersion pipe and being secured thereto by said screw bolts.

9. An immersion pipe according to claim 7, wherein each of said screw bolts includes a head arranged at the radial inside of said immersion pipe which is covered by a cover.

10. An immersion pipe according to claim 7, wherein said fastening arrangement includes a cap for receiving a thickened portion of a head of said screw bolts, said immersion pipe segments being clamped to said spacer arrangement by said cap.

11. An immersion pipe according to claim 7, wherein said screw bolts comprise nuts at a radially outwardly disposed end of said screw bolts with which the screw bolts are supported at a radial outside end of said spacer arrangement by spring washers.

12. An immersion pipe according to claim 7, wherein said spacer arrangement includes a web which extends upwardly at a radially inner end of said spacer arrangement, and each immersion pipe segment of said top row comprises a radially outwardly projection engageable with said web, whereby each of immersion pipe segments of said top row are vertically supported by said web and said projection.

13. An immersion pipe according to claim 7, wherein a crossing/joint region wherein two immersion pipe segments neighboring one another side-by-side and tow arranged therebelow adjoin, a retainer plate covering the crossing/joint region at one radial side of the segments is arranged, said retainer plate having four cross-bolts that are plugged through four corresponding holes in four adjoining comers of the immersion pipe segments, and wherein cross-brackets for securing said retainer plate are positioned on an opposite radial side of said pipe segments and are secured on the four cross-bolts that are plugged through.

14. An immersion pipe for use in a cyclone separator, wherein said cyclone separator includes a gas discharge conduit having an exterior circumference and being interiorly insulated by a refractory lining defining an interior circumference, comprising:

a plurality of segments being joined together in rows and columns to form said immersion pipe with a circumference of said immersion pipe being approximately equal to said interior circumference, a fastening arrangement comprising a plurality of screw bolts for releasably connecting a top row of said segments to said gas discharge conduit, and a spacer sleeve surrounding each screw bolt, being distributed around a circumference of said immersion pipe and being secured to and extending radially inwardly from said exterior circumference of said gas discharge conduit to said interior circumference of said refractory lining, said spacer sleeves having at least one opening therein to a radial outside thereof to provide access for ambient air to flow into a space surrounding said fastening arrangement.

15. An immersion pipe according to claim 14, wherein each of said screw bolts includes a head arranged at the radial inside of said immersion pipe which is covered by a cover.

16. An immersion pipe according to claim 14, wherein said fastening arrangement includes a cap for receiving a thickened portion of a head of said screw bolts, said immersion pipe segments being clamped to said spacer sleeves by said cap.

17. An immersion pipe according to claim 14, wherein said screw bolts comprise nuts at a radially outwardly disposed end of said screw bolts with which the screw bolts are supported at a radial outside end of said spacer sleeves by spring washers.

18. An immersion pipe according to claim 14, wherein said spacer sleeves include a web which extends upwardly at a radially inner end of said spacer sleeves, and each immersion pipe segment of said top row comprises a radially outwardly projection engageable with said web, whereby each of immersion pipe segments of said top row are vertically supported by said web and said projection.

19. An immersion pipe according to claim 14, wherein a crossing/joint region wherein two immersion pipe segments neighboring one another side-by-side and two arranged therebelow adjoin, a retainer plate covering the crossing/joint region at one radial side of the segments is arranged, said retainer plate having four cross-bolts that are plugged through four corresponding holes in four adjoining comers of the immersion pipe segments, and wherein cross-brackets for securing said retainer plate are positioned on an opposite radial side of said pipe segments and are secured on the four cross-bolts that are plugged through.

* * * * *